Sept. 19, 1961 W. A. KUHRT 3,000,176
DUCTED FAN ENGINE
Filed April 5, 1957

INVENTOR
WESLEY A. KUHRT
BY
ATTORNEY

United States Patent Office 3,000,176
Patented Sept. 19, 1961

3,000,176
DUCTED FAN ENGINE
Wesley A. Kuhrt, East Glastonbury, Conn., assignor to United Aircraft Corporation, East Hartford, Conn., a corporation of Delaware
Filed Apr. 5, 1957, Ser. No. 650,986
5 Claims. (Cl. 60—35.6)

This invention relates to power plants, and more particularly to ducted fan type power plants utilizing gaseous fuels which are stored in a liquid state.

It is an object of this invention to provide a liquid hydrogen powered ducted fan having a very low specific weight.

It is a further object of this invention to provide a ducted fan power plant having an impulse turbine comprising injection nozzles adjacent the tips of the fan blades for driving the fan.

A still further object of this invention is to provide a heat exchanger for gasifying the liquid fuel and extracting energy from the fuel to drive the fan prior to burning the fuel in the combustion section.

These and other objects of this invention will become readily apparent from the following detailed description of the drawing in which.

Figures 1, 2, 3:
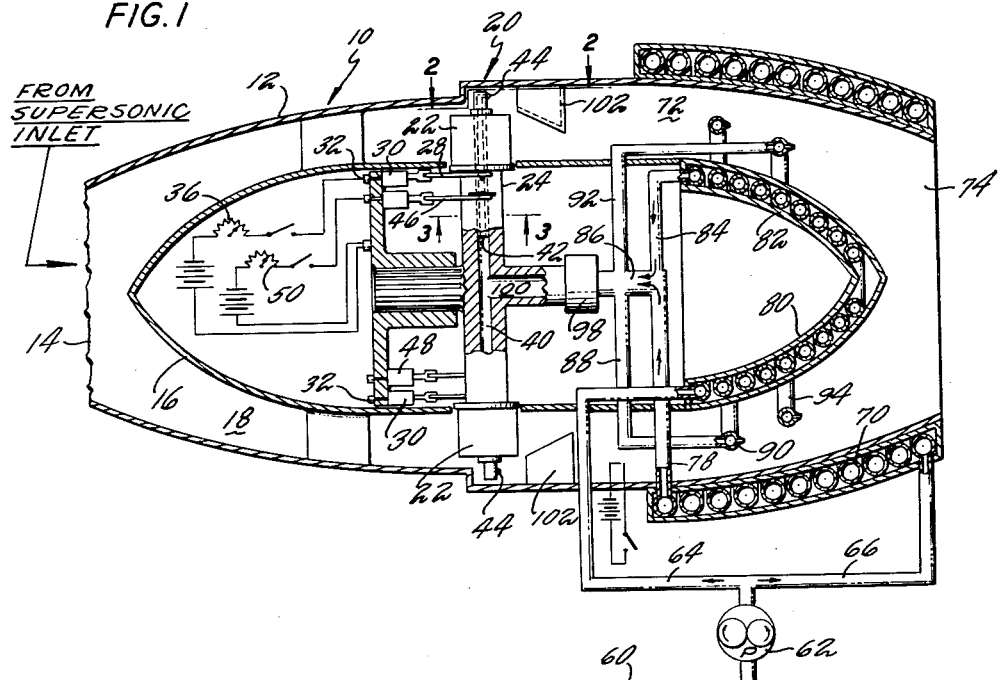
FIG. 1 is a schematic cross-sectional illustration of the power plant of this invention.
FIG. 2 is a cross-sectional illustration taken along the line 2—2 of FIG. 1.
FIG. 3 is a cross-sectional illustration taken along the line 3—3 of FIG. 1.

Referring to FIG. 1, a power plant is generally indicated at 10 as having an annular casing 12, an air inlet 14 which receives air from a suitable supersonic inlet. A inner body 16 is located within the casing 12 and therebetween forms the annular chamber 18. Air flow from the chamber 18 is passed through a fan generally indicated at 20. The fan 20 includes a plurality of fan blades 22 which are peripherally spaced about the hub or spoke member 24.

Each of the fan blades 22 has an arm 28 eccentrically mounted relative to the spanwise axis of the blade (see also FIG. 2). Each of the arms 28 is connected to a proportional solenoid 30 for positioning the blades either at a desirable angle of attack or in a feathered position. All of the proportional solenoids which operate all of the fan blades are connected by means of a slip ring 32 to a potentiometer 36 to vary the voltage going to the proportional solenoids 30. The reason the fan blades 22 are positionable in a feathered position is that at extremely high Mach numbers of operation the power plant may be operated as nearly as a ram jet as possible.

The hub or spoked member 24 contains a plurality of radially extending passages 40 therein. In each of the passages 40 is located a tubular member 42 which terminates at its outer end in a curved passage and a de Laval nozzle 44. The nozzles 44 are properly oriented in their direction of discharge so as to drive the fan 20. The nozzles 44 and the passages leading thereto act as an impulse turbine. An impulse turbine is one which derives all of its energy from the velocity of the working medium rather than from pressure. Each of the hollow rod members 42 have connected thereto a link 46, each of which is connected to a proportional solenoid 48. The proportional solenoids are positioned by a potentiometer 50. Thus, the direction of discharge or ejection of the fluid from the nozzles 44 may be suitably controlled to vary the operation of the power plant. Thus by changing the direction, it may be possible to vary the speed of rotation of the fan 20.

As seen in FIG. 1, a tank 60 is shown and may contain hydrogen in a liquid state. Liquid hydrogen is pumped at very high pressure via the pump 62 to parallel lines 64 and 66. The line 66 conducts liquid fuel to a heat exchanger 70 which is wrapped around the aft section of the combustion chamber 72 and the exhaust nozzle 74. The heat exchanger gasifies the liquid hydrogen while at the same time cooling the exhaust nozzle, and the gasified hydrogen then flows out of the heat exchanger via the line 78. At the same time, liquid hydrogen is pumped via the line 64 to a heat exchanger 80 which is wrapped around the tail cone section 82 of the inner body 16. Gasified fuel then flows from the line 84 and combines with the flow from the line 78 at an axially disposed pipe 86. Some of the fuel from the pipe 86 flows to a line 88 which feeds an upstream combined fuel discharge ring 90 and flameholder, while other fuel flows through the line 92 to feed gasified fuel to the aft combined discharge ring and flameholder 94. A portion of the high energy gasified fuel flows through a coupling 98 and is fed to the passage 100 which distributes the fuel to each of the radial passages 40.

The eventual ejection of the high pressure gasified fuel from the peripherally disposed nozzles 44 drives the fan 20.

The proportioning of the fuel introduced into the turbine and the downstream fuel injection stations is a function of the power required for the fan. These requirements will be governed by the flight Mach number and altitude.

In order to enhance the mixing of the air and the gasified hydrogen fuel being emitted from the nozzles 44, a plurality of V-shaped mixing devices 102 are provided (see FIGS. 1 and 2). The mixing devices 102 are peripherally spaced about the inner periphery of the casing 12 and are open at their front end 104 and converge in a downstream direction so as to terminate in a small opening 106 at the downstream end thereof. The mixing devices help to move the hydrogen fuel from the recessed wall toward the center of the stream whereby efficient burning may take place in the combustion chamber 72.

It will be apparent as a result of this invention that a very low specific weight liquid hydrogen powered ducted fan has been provided. Thus a highly efficient, yet lightweight power plant is available for moving a suitable vehicle at very high Mach numbers.

The combustion chamber of this invention is short because of the high reaction rate of the burning process of hydrogen and air or the high flame speed of hydrogen and air. Furthermore, stoichiometric temperatures may be used because of the cooled burner walls.

Although only one embodiment of this invention has been illustrated and described herein, it will be apparent that various changes and modifications may be made in the construction and arrangement of the various parts without departing from the scope of this novel concept.

What it is desired by Letters Patent is:

1. In a power plant having a duct and an air inlet therefor, a fan having blades located in said duct for moving air therethrough, a combustion chamber downstream of said fan, an impulse turbine for driving the fan, a source of normally gaseous fuel in a liquid state, a heat exchanger adjacent said combustion chamber, a high pressure pump for pumping liquid fuel through said heat exchanger to gasify said fuel, the gasified fuel alone driving said impulse turbine, said impulse turbine comprising a plurality of nozzles carried adjacent outer tips of said blades for emitting externally of said blades a plurality of streams of gasified fuel into the air pumped by said fan, and means for mixing said fuel and said air prior to entrance into said combustion chamber, and means for varying the pitch of said fan blades to feather the latter and operate as a ramjet.

2. In a power plant having a duct and an air inlet therefor, a fan having blades located in said duct for moving air therethrough, a combustion chamber downstream of said fan, an impulse turbine for driving the fan, a source of normally gaseous fuel in a liquid state, a heat exchanger adjacent said combustion chamber, a high pressure pump for pumping liquid fuel through said heat exchanger to gasify said fuel, the gasified fuel alone driving said impulse turbine, said impulse turbine comprising a plurality of nozzles carried adjacent outer tips of said blades for emitting externally of said blades a plurality of streams of gasified fuel into the air pumped by said fan, means for mixing said fuel and said air prior to entrance into said combustion chamber, and means for varying the direction of fuel ejection from said nozzles.

3. In a power plant having a duct and an air inlet therefor, a fan having blades located in said duct for moving air therethrough, a combustion chamber downstream of said fan, an impulse turbine for driving the fan, a source of normally gaseous fuel in a liquid state, a heat exchanger adjacent said combustion chamber, a high pressure pump for pumping liquid fuel through said heat exchanger to gasify said fuel, the gasified fuel alone driving said impulse turbine, said impulse turbine comprising a plurality of nozzles carried adjacent outer tips of said blades for emitting externally of said blades a plurality of streams of gasified fuel into the air pumped by said fan, means for mixing said fuel and said air prior to entrance into said combustion chamber, means for varying the pitch of said fan blades to feather the latter and operate as a ramjet, and means for varying the direction of fuel ejection from said nozzles.

4. In a power plant having a central body, a fan including blades carried by said body, means for varying the pitch of said blades, an outer casing surrounding said fan and body forming a duct, a combustion chamber receiving air from said fan, and an exhaust nozzle downstream of said combustion chamber, a source of liquid fuel, a first heat exchanger carried by said outer casing adjacent said combustion chamber, a pump for pumping fuel through said heat exchanger, a second heat exchanger carried by the aft end of said central body, means for conducting fuel from said source to said second heat exchanger to gasify said fuel, jet means adjacent the outer periphery of said fan and carried thereby, said jet means being directed at least in part at an angle transversely of the axis of rotation of said fan, means for conducting gasified fuel from at least one of said exchangers to said jets for rotating said fan and injecting fuel into said combustion chamber, and means for further injecting fuel into said combustion chamber located downstream of said jet means.

5. In a power plant having a fan including a hub and a plurality of radially extending blades circumferentially spaced about said hub, means for varying the pitch of said fan blades, a turbine for driving the fan including a plurality of fuel nozzles adjacent the outer periphery of said fan, a combustion chamber, a nozzle receiving gases from said combustion chamber, a source of chemical fuel in a liquid state, a heat exchanger adjacent said combustion chamber for vaporizing said fuel, means for conducting fuel from said exchanger to said fuel nozzles for rotating said fan, means for burning said fuel in said combustion chamber, a second heat exchanger receiving fluid fuel from said source for heating said fuel, and a second injector for injecting fuel into said combustion chamber, said second injector being downstream of said first injector.

References Cited in the file of this patent

UNITED STATES PATENTS

| | | |
|---|---|---|
| 2,483,045 | Harby | Sept. 27, 1949 |
| 2,592,938 | McNaught | Apr. 15, 1952 |
| 2,602,289 | Anxionnaz et al. | July 8, 1952 |
| 2,620,625 | Phaneuf | Dec. 9, 1952 |
| 2,762,192 | Ward | Sept. 11, 1956 |
| 2,883,828 | Howell | Apr. 28, 1959 |

FOREIGN PATENTS

| | | |
|---|---|---|
| 749,009 | Great Britain | May 16, 1956 |